United States Patent
Rhoden et al.

(10) Patent No.: US 9,550,576 B2
(45) Date of Patent: Jan. 24, 2017

(54) SMALL ENGINE COOLED COOLING AIR SYSTEM

(75) Inventors: William E. Rhoden, Glastonbury, CT (US); Peter L. Jalbert, Granby, CT (US); Rudolph Thomas Beaupre, Southwick, MA (US); David Russell Scott, Walsall (GB)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1076 days.

(21) Appl. No.: 13/354,689

(22) Filed: Jan. 20, 2012

(65) Prior Publication Data

US 2013/0186100 A1     Jul. 25, 2013

(51) Int. Cl.
| | | |
|---|---|---|
| *F02C 6/08* | (2006.01) | |
| *F02C 7/18* | (2006.01) | |
| *F02C 7/22* | (2006.01) | |
| *B64D 37/34* | (2006.01) | |
| *F02C 7/224* | (2006.01) | |
| *B64D 13/00* | (2006.01) | |

(52) U.S. Cl.
CPC .............. *B64D 37/34* (2013.01); *B64D 13/006* (2013.01); *F02C 6/08* (2013.01); *F02C 7/18* (2013.01); *F02C 7/224* (2013.01); *Y02T 50/56* (2013.01)

(58) Field of Classification Search
CPC .................. F02C 6/08; F02C 7/12; F02C 7/14; F02C 7/16; F02C 7/18; F02C 7/185; F02C 7/224; F02C 7/22; F02C 9/18; F05D 2260/213; F05D 2260/98; F23R 3/28; F01D 25/18; F01D 25/08; B64D 37/34
See application file for complete search history.

(56) References Cited

U.S. PATENT DOCUMENTS

| | | | |
|---|---|---|---|
| 4,773,212 A * | 9/1988 | Griffin et al. .................... | 60/772 |
| 6,315,815 B1 | 11/2001 | Spadaccini et al. | |
| 6,615,574 B1 * | 9/2003 | Marks ....................... | F02C 7/18 |
| | | | 60/772 |
| 6,707,492 B1 | 3/2004 | Itani | |
| 6,939,392 B2 * | 9/2005 | Huang et al. ..................... | 95/46 |
| 7,041,154 B2 | 5/2006 | Staroselsky et al. | |
| 7,153,343 B2 | 12/2006 | Burlatsky et al. | |
| 7,175,693 B2 | 2/2007 | Spadaccini et al. | |
| 7,231,769 B2 | 6/2007 | Spadaccini et al. | |
| 7,260,926 B2 | 8/2007 | Sabatino et al. | |
| 7,329,305 B2 | 2/2008 | Sloan | |
| 7,377,112 B2 | 5/2008 | Spadaccini et al. | |
| 7,393,388 B2 | 7/2008 | Spadaccini et al. | |
| 7,431,818 B2 | 10/2008 | Cipollini | |
| 7,435,283 B2 * | 10/2008 | Tillman et al. .................. | 95/46 |
| 7,465,335 B2 | 12/2008 | Schmidt | |
| 7,465,336 B2 | 12/2008 | McHugh | |
| 7,537,646 B2 | 5/2009 | Chen et al. | |
| 7,569,099 B2 | 8/2009 | Coffin et al. | |

(Continued)

*Primary Examiner* — Andrew Nguyen
(74) *Attorney, Agent, or Firm* — Kinney & Lange, P.A.

(57) ABSTRACT

A system for managing thermal transfer in an aircraft includes a fuel stabilization unit, a fuel-air heat exchanger, and a turbine. The fuel-air heat exchanger is located downstream from the fuel stabilization unit. The fuel-air heat exchanger places deoxygenized fuel in a heat exchange relationship with compressor bleed air to produce heated deoxygenized fuel and cooled bleed air. The turbine is operationally connected to the engine compressor and receives cooled bleed air from the fuel-air heat exchanger.

15 Claims, 5 Drawing Sheets

(56) References Cited

U.S. PATENT DOCUMENTS

| | | |
|---|---|---|
| 7,582,137 B2 | 9/2009 | Chen et al. |
| 7,601,203 B2 | 10/2009 | Reeve et al. |
| 7,615,104 B2 | 11/2009 | Cordatos et al. |
| 7,632,338 B2 | 12/2009 | Cipollini |
| 7,718,302 B2 | 5/2010 | Cipollini |
| 7,744,827 B2 | 6/2010 | Vanderspurt et al. |
| 7,882,704 B2 | 2/2011 | Chen |
| 8,056,345 B2 | 11/2011 | Norris et al. |
| 2002/0121082 A1* | 9/2002 | Hashimoto ............... F01D 9/02 60/266 |
| 2004/0172947 A1* | 9/2004 | Takahama ................. F02C 6/18 60/772 |
| 2005/0155353 A1* | 7/2005 | Sabatino et al. ................ 60/772 |
| 2005/0268619 A1* | 12/2005 | Ress, Jr. .......................... 60/782 |
| 2007/0101731 A1 | 5/2007 | Bayt et al. |
| 2007/0264133 A1 | 11/2007 | Schwarz et al. |
| 2008/0310955 A1* | 12/2008 | Norris et al. ................. 415/178 |
| 2009/0056342 A1* | 3/2009 | Kirzhner ........................ 60/772 |
| 2009/0074589 A1* | 3/2009 | Fang ........................ F02C 7/12 416/97 R |
| 2009/0260775 A1* | 10/2009 | Maucher et al. ............... 165/41 |
| 2011/0247315 A1 | 10/2011 | Rhoden |
| 2012/0304662 A1* | 12/2012 | Prociw ................... F01D 25/12 60/782 |

\* cited by examiner

SMALL ENGINE COOLED COOLING AIR SYSTEM

BACKGROUND

The present disclosure relates generally to thermal management, and more specifically to systems and methods for managing thermal transfer in an aircraft having a gas turbine engine.

Gas turbine engines experience hot operating conditions, which limit engine component life. Modern aircraft employ sophisticated thermal management systems to cool these hot engine structures. Unfortunately, the commonly used thermal heat sinks have already reached their useful limits and are unavailable for additional engine cooling needs.

At the same time, it desirable to heat fuel delivered to the engine in order to maximize engine efficiency. Fuel temperature, however, is limited by the formation of insoluble products referred to as "coke". Coke forms when hydrocarbon fuel containing oxygen is heated beyond a certain temperature (e.g. above 250° F. or 121° C.). Coke deposits limit fuel system component life and degrade engine performance.

SUMMARY

A system for managing thermal transfer in an aircraft includes a fuel stabilization unit, a fuel-air heat exchanger, and a turbine. The fuel stabilization unit creates deoxygenized fuel. The fuel-air heat exchanger is fluidly connected to the fuel stabilization unit and fluidly connected to a portion of an engine compressor. The fuel-air heat exchanger places the deoxygenized fuel in a heat exchange relationship with bleed air to produce heated deoxygenized fuel and cooled bleed air. The turbine is fluidly connected to the fuel-air heat exchanger and operationally connected to the engine compressor. The turbine receives the cooled first bleed air from the fuel-air heat exchanger.

A system for managing thermal transfer in an aircraft includes a fuel tank, a fuel-oil heat exchanger, a fuel stabilization unit, a fuel-air heat exchanger, an engine compressor, a combustor, a turbine, and a conduit. The fuel-oil heat exchanger is located downstream from the fuel tank, the fuel stabilization unit is located downstream from the fuel-oil heat exchanger, and the fuel-air heat exchanger is located downstream from the fuel stabilization unit. The fuel-air heat exchanger is fluidly connected to the fuel stabilization unit. The engine compressor has a first location fluidly connected to the fuel-air heat exchanger. The combustor is located downstream from the fuel-air heat exchanger. The turbine is operationally connected to both the engine compressor and the combustor. The conduit fluidly connects the fuel-air heat exchanger to the turbine.

A method for managing thermal transfer in an aircraft including storing fuel, removing oxygen from the stored fuel to create deoxygenized fuel, and placing the deoxygenized fuel in a heat exchange relationship with bleed air to produce heated deoxygenized fuel and cooled bleed air. The method further includes combusting the heated deoxygenized fuel and cooling an engine turbine with the cooled bleed air.

DETAILED DESCRIPTION

Figure 1:
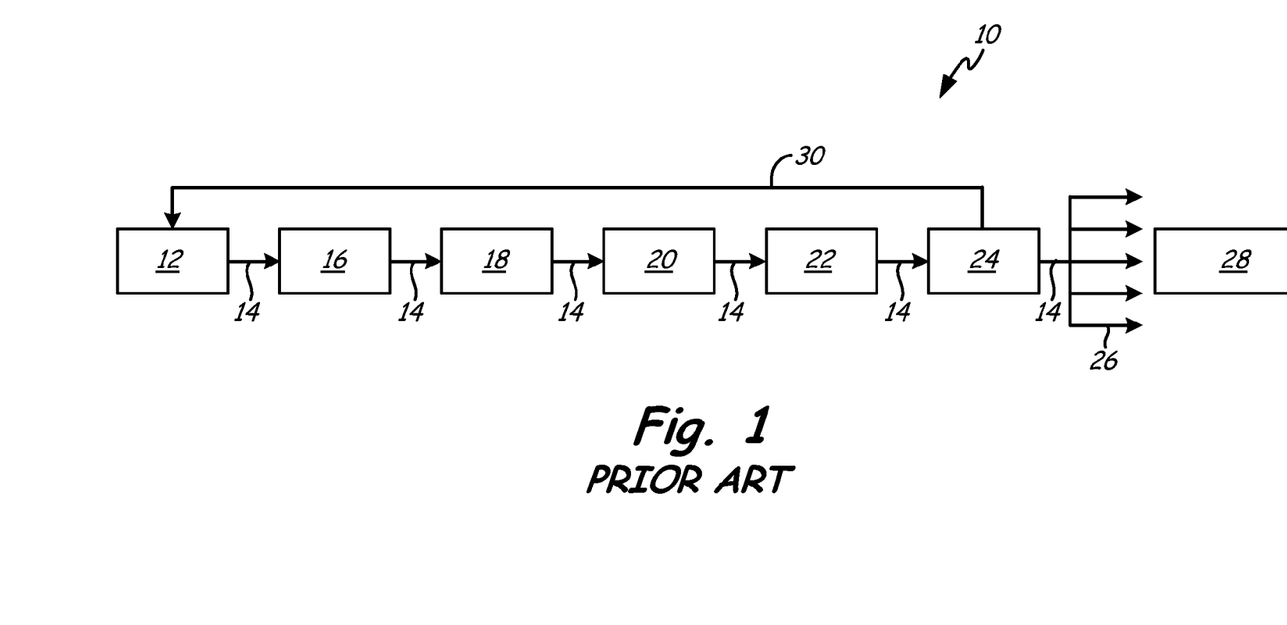
FIG. 1 is a schematic diagram of a fuel system in accordance with the prior art.

FIG. 1 is a schematic diagram of fuel system 10 in accordance with the prior art. Fuel system 10 includes fuel tank 12, tank-to-engine conduit 14, low pressure pump 16, fuel-oil heat exchanger 18, fuel filter 20, high pressure pump 22, valve 24, nozzles 26, combustor 28, and return-to-tank conduit 30. Fuel flows from fuel tank 12 to combustor 28 of a gas turbine engine along tank-to-engine conduit 14. A portion of fuel is diverted upstream of combustor 28 and flows along return-to-tank conduit 30 back to tank 12 in order to manage gas turbine fuel delivery rate requirements in fuel system 10.

Fuel for combustor 28 is stored in tank 12. Fuel flows out of tank 12 and along tank-to-engine conduit 14 that connects tank 12, low pressure pump 16, fuel-oil heat exchanger 18, fuel filter 20, high pressure pump 22, valve 24, and nozzles 26 in flow series. From tank 12, fuel is pumped by low pressure pump 16 into fuel-oil heat exchanger 18. Fuel-oil heat exchanger 18 transfers a heat load from an oil lubrication system to the fuel, thereby increasing fuel temperature and decreasing oil temperature. Fuel exits fuel-oil heat exchanger 18 and travels through fuel filter 20 where impurities are removed. Fuel is pumped by high pressure pump 22 to valve 24 where fuel is metered for nozzles 26. Fuel is then sprayed by nozzles 26 into combustor 28 for combustion. A portion of fuel is redirected from valve 24 back to tank 12 through return-to-tank conduit 30.

Fuel temperature increases as fuel traverses tank-to-engine conduit 14. Fuel-oil heat exchanger 18 and high pressure pump 22 both increase fuel temperature. Fuel at valve 24 is typically in the range of about 225-250° F. (107-121° C.). An increase in the amount of fuel diverted along return-to-tank conduit 30 can result in an increase in the average fuel temperature in tank 12, and therefore, the temperature of fuel throughout fuel system 10. When fuel temperature exceeds about 250° F. (121° C.), dissolved oxygen within the fuel reacts with the fuel to form coke. Coke deposits in fuel system 10 impair normal functioning and reduce component life.

Figure 2:
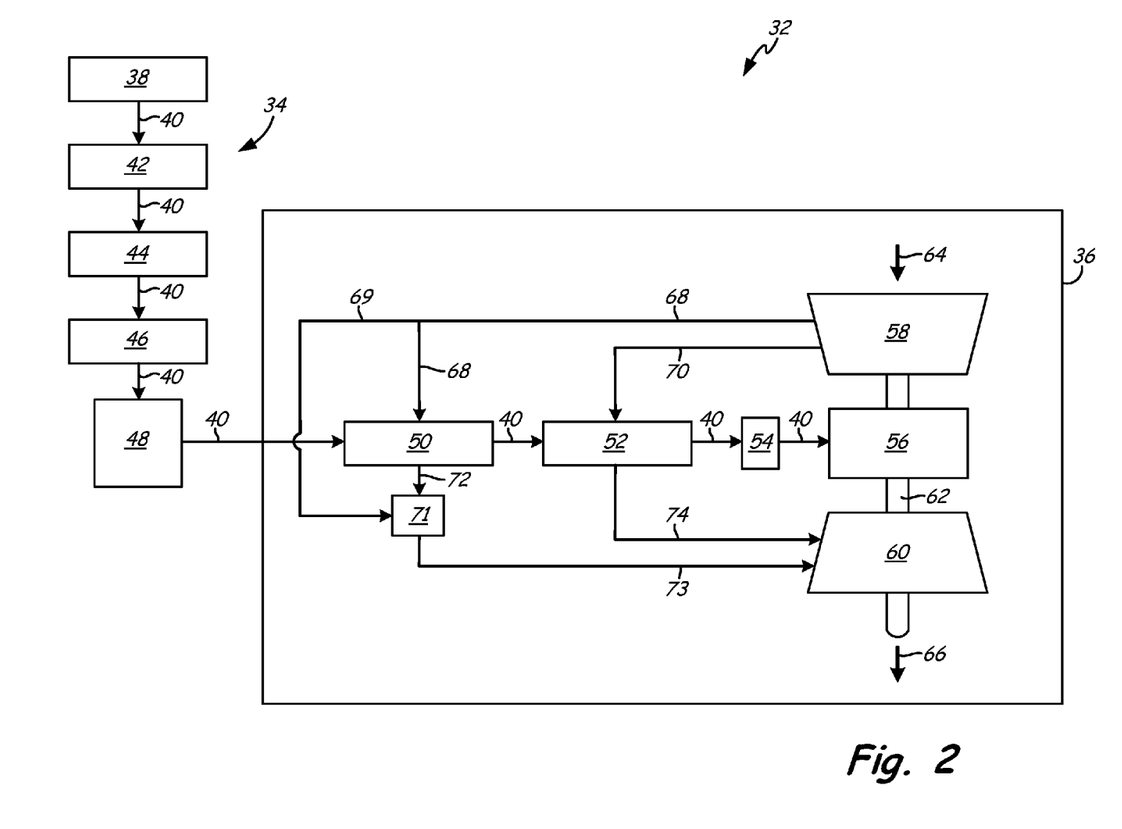
FIG. 2 is a schematic diagram of a thermal management system in accordance with the present disclosure.

FIG. 2 is a schematic diagram of thermal management system 32 in accordance with the present disclosure. Thermal management system 32 includes fuel system 34 and gas turbine engine 36. Fuel system 34 includes tank 38, tank-to-engine conduit 40, first fuel-oil heat exchanger 42, fuel stabilization unit 44, second fuel-oil heat exchanger 46, pump 48, first fuel-air heat exchanger 50, second fuel-air heat exchanger 52, nozzles 54, and combustor 56. Gas turbine engine 36 includes first fuel-air heat exchanger 50, second fuel-air heat exchanger 52, nozzles 54, combustor 56, compressor 58, turbine 60, shaft 62, ambient air 64, expanded air 66, first bleed air conduit 68, first bypass conduit 69, second bleed air conduit 70, gate valve 71, first cooled bleed air conduit 72, first exhaust air conduit 73, and second exhaust air conduit 74. Fuel is heated by first bleed air and second bleed air from compressor 58 within first fuel-air heat exchanger 50 and second fuel-air heat exchanger 52, respectively. Turbine 60 is cooled by first exhaust air and second exhaust air exhausted from first fuel-air heat exchanger 50 and second fuel-air heat exchanger 52, respectively. Accordingly, thermal management system 32 uses fuel system 34 as a heat sink for cooling air for gas turbine engine 36.

Fuel system 34 of FIG. 2 shares some similarities with fuel system 10 of FIG. 1 and like names designate like components. Fuel for combustor 56 is stored in tank 38. Fuel flows out of tank 38 and along tank-to-engine conduit 40 that connects tank 38, first fuel-oil heat exchanger 42, fuel stabilization unit 44, second fuel-oil heat exchanger 46, pump 48, first fuel-air heat exchanger 50, second fuel-air heat exchanger 52, and nozzles 54 in flow series. Fuel system 34 is simplified for clarity, but can include multiple pumps (like low pressure pump 16 and high pressure pump 22 shown in FIG. 1) and/or a filter (like fuel filter 20 shown in FIG. 1). Fuel within tank 38 is near ambient air temperature, which is about 60° F. (16° C.). From tank 38, fuel flows along fuel-to-engine conduit 40 and into first fuel-oil heat exchanger 42. First fuel-oil heat exchanger 42 transfers a heat load from an oil system to the fuel, thereby increasing fuel temperature and decreasing oil temperature. Fuel exiting first fuel-oil heat exchanger 42 is between about 140° F. (60° C.) and about 220° F. (104° C.), and most likely near about 180° F. (82° C.).

From first fuel-oil heat exchanger 42, fuel continues along fuel-to-engine conduit 40 and enters fuel stabilization unit 44. Fuel stabilization unit 44 removes oxygen from the fuel thereby allowing for additional heating of fuel without the formation of coke. Fuel stabilization unit 44 can be a flat plate, a conformal design, a flat membrane, and/or a 3-D design. Possible fuel stabilization units are described in U.S. Pat. No. 6,315,815 titled "Membrane Based Fuel Deoxygenator", U.S. Pat. No. 7,231,769 titled "Gas Turbine Cooling System", and U.S. Pat. No. 7,615,104 titled "Fuel Deoxygenation System with Multi-layer Oxygen Permeable Membrane", which are all hereby incorporated by reference as if they were set forth in their entirety.

Deoxygenated fuel exits fuel stabilization unit 44, continues along fuel-to-engine conduit 40 and enters an optional second fuel-oil heat exchanger 46. Second fuel-oil heat exchanger 46 is "optional" in that thermal management system 32 functions as intended with or without the presence of second fuel-oil heat exchanger 46. Whether or not second fuel-oil heat exchanger is desirable depends on the needs of thermal management system 32, including fuel system 34 and gas turbine engine 36. Like first fuel-oil heat exchanger 42, second fuel-oil heat exchanger 46 transfers a heat load from the oil system to the fuel, thereby increasing fuel temperature and decreasing oil temperature. If used, fuel exiting second fuel-oil heat exchanger 46 is between about 160° F. (71° C.) and about 240° F. (116° C.), and most likely near about 200° F. (93° C.). From second fuel-oil heat exchanger 46, fuel continues along fuel-to-engine conduit 40 to pump 48. Pump 48 pumps fuel and also adds heat to fuel. Fuel exiting pump 48 is between about 210° F. (99° C.) and about 290° F. (143° C.), and most likely near about 250° F. (121° C.).

From pump 48, fuel continues along fuel-to-engine conduit 40, which now enters gas turbine engine 36, and flows into first fuel-air heat exchanger 50. Within first fuel-air heat exchanger 50, heat is dumped from first compressor bleed air into the fuel. Fuel exiting first fuel-air heat exchanger 50 is between about 310° F. (154° C.) and about 390° F. (199° C.), and most likely near about 350° F. (177° C.). From first fuel-air heat exchanger 50, fuel continues along fuel-to-engine conduit 40 and into an optional second fuel-air heat exchanger 52. Second fuel-air heat exchanger 52 is "optional" in that thermal management system 32 functions as intended with or without the presence of second fuel-air heat exchanger 52. Whether or not second fuel-air heat exchanger 52 is desirable depends on the needs of thermal management system 32, including fuel system 34 and gas turbine engine 36. If used, fuel is heated within second fuel-air heat exchanger 52 because heat is dumped from second compressor bleed air into the fuel. Fuel exiting second fuel-air heat exchanger 52 is between about 560° F. (293° C.) and about 640° F. (338° C.), and most likely near about 600° F. (316° C.). From second fuel-air heat exchanger 52 the fuel continues along fuel-to-engine conduit 40 to nozzles 54, which spray the fuel into combustor 56 for combustion. Since fuel system 34 includes fuel stabilization unit 44, fuel can be successfully heated to about 600° F. (316° C.) without coking, thereby improving engine performance and component life (e.g. filters, screens, and fuel nozzles).

Combustor 56 is operationally attached between compressor 58 and turbine 60. Compressor 58 and turbine 60 are physically attached by shaft 62. In operation, ambient air 64 enters an upstream end of gas turbine engine 36. Ambient air 64 is compressed by compressor 58. Compressor 58 may include two compressors connected in series, such as a low pressure compressor and a high pressure compressor. The compressed air then enters combustor 56, where it is mixed with fuel from fuel system 34 and combusted. Combusted air enters turbine 60 where it is expanded. Turbine 60 may include two turbines connected in series, such as a high pressure turbine and a low pressure turbine. The expanded air forces turbine 60 to rotate, which drives compressor 58. Expanded air 66 is exhausted from a downstream end of gas turbine engine 36 providing energy (e.g. a propulsive force for an aircraft).

First bleed air conduit 68 connects a first location of compressor 58 to first fuel-air heat exchanger 50. First bleed air conduit 68 directs first bleed air from a first location of compressor 58, such as a low or early stage of compressor 58. This first bleed air within first bleed air conduit 68 is relatively hot from compression and is between about 760° F. (404° C.) and about 840° F. (449° C.), and most likely near about 800° F. (427° C.). This first bleed air dumps heat into fuel within first heat exchanger 50 and then exits first heat exchanger 50 via first cooled bleed air conduit 72. Bypass conduit 69 fluidly connects first bleed air conduit 68 to gate valve 71. Bypass conduit 69 allows a portion of first bleed air to bypass heat exchanger 50 and flow directly to gate valve 71. Bypass conduit 69 and first cooled bleed air conduit 72 converge at gate valve 71. Gate valve 71 determines whether first bleed air from bypass conduit 69 or cooled bleed air from first cooled bleed air conduit 72 continues along first exhaust conduit 73 to a first location of turbine 60. The structure and function of first heat exchanger 50 is described further below with reference to FIGS. 3A and 3B, and the structure of gate valve 71 is described further below with reference to FIGS. 4A and 4B.

When gate valve 71 is open to first cooled bleed air conduit 72, first cooled bleed air is sent through gate valve 71 to first exhaust conduit 73. First cooled bleed air within first cooled bleed air conduit 72 will be slightly cooled and between about 560° F. (293° C.) and about 640 ° F. (338° C.), and most likely near about 600° F. (316° C.). When gate valve 71 is open to bypass conduit 69, first bleed air is sent through gate valve 71 to first exhaust conduit 73. First bleed air within bypass conduit 69 is still relatively hot from compression and is between about 760° F. (404° C.) and about 840° F. (449° C.), and most likely near about 800° F. (427° C.). First exhaust conduit 73 directs the first bleed air, whether cooled by heat exchanger 50 or not, from gate valve 71 to a first location of turbine 60. The first bleed air and/or first cooled bleed is used by turbine 60 as a cooling air flow to manage the hot operating conditions. For example, the first bleed air and/or first cooled bleed air can be used to cool a case of turbine 60 and decrease a gap between blades and the case caused by heat.

Second bleed air conduit 70 connects a second location of compressor 58 to second fuel-air heat exchanger 52. Second bleed air conduit 70 directs second bleed air from a second location of compressor 58, such as a high or late stage of compressor 58. This second bleed air within second bleed air conduit 70 is hot from compression and is between about 1060° F. (571° C.) and about 1140° F. (616° C.), and most likely near about 1100° F. (593° C.). This second bleed air dumps heat into fuel in second heat exchanger 52 and then exits second heat exchanger 52 via second exhaust air conduit 74. A bypass conduit (like bypass conduit 69) and a gate valve (like gate valve 71) can connect second bleed air conduit 70 to second exhaust conduit 74 and provide a means for bypassing second bleed air around second heat exchanger 52. Second exhaust air conduit 74 connects second heat exchanger 52 to a second location of turbine 60. Second cooled bleed air exiting second heat exchanger 52 is cooled and is between about 760° F. (404° C.) and about 840° F. (449° C.), and most likely near about 800° F. (427° C.). Second cooled bleed air is sent via second exhaust conduit 74 to second location of turbine 60, such as a stator, and provides cooling air flow to manage the hot operating conditions of turbine 60. The second cooled bleed air can be used to cool stators in turbine 60, which reduces heat damage and extends component life.

Thermal management system 32 is known as a "cooled cooling air" system because it rejects thermal energy from compressor bleed air (into fuel system 34), and then uses that cooled bleed air to provide cooling air flow to turbine 60. Thermal management system 32 can be used in a variety of situations that place fuel system 34 in a heat exchange relationship with bleed air from gas turbine engine 36. Thermal management system 32 is configured to heat fuel and cool bleed air to doubly benefit engine efficiency and component life. Fuel in fuel system 34 is heated about four times more than in a conventional system (such as fuel system 10), thereby improving engine efficiency. Fuel consumption improvements are expected in the range of about 1-3%. Cooled bleed air reduces heat damage and increases engine component life. The benefits of thermal management system 32 may be substantial for small regional jets having engines with a thrust class of up to 25,000 pounds. Use of particular fuel-air heat exchangers and valves described below provide additional advantages for thermal management system 32.

Figure 3A:
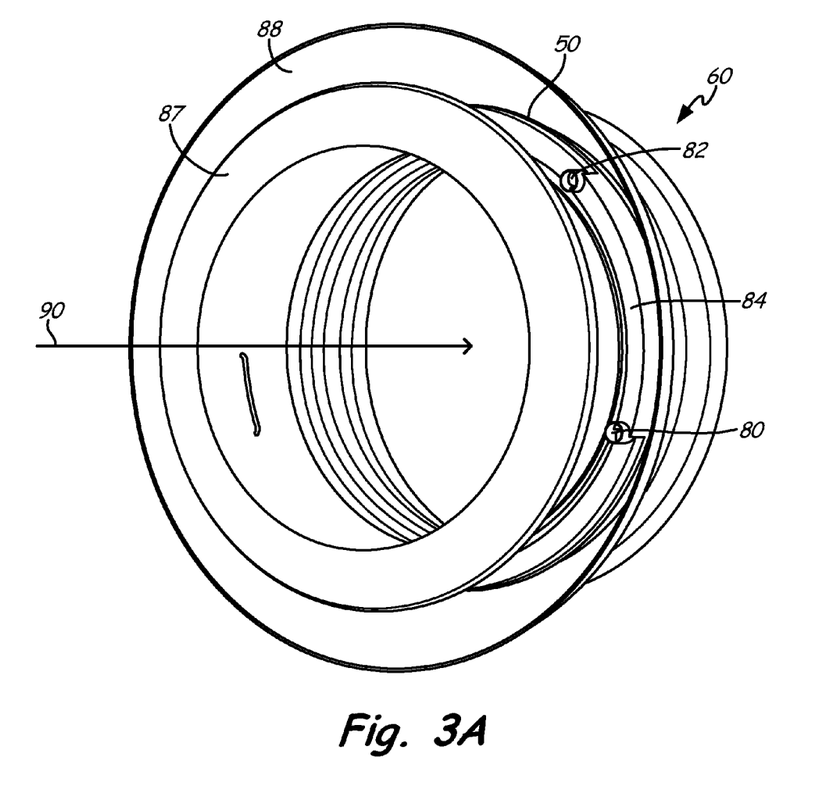
FIGS. 3A and 3B are perspective views of a heat exchanger for use in the thermal management system of FIG. 2.
Figure 3B:
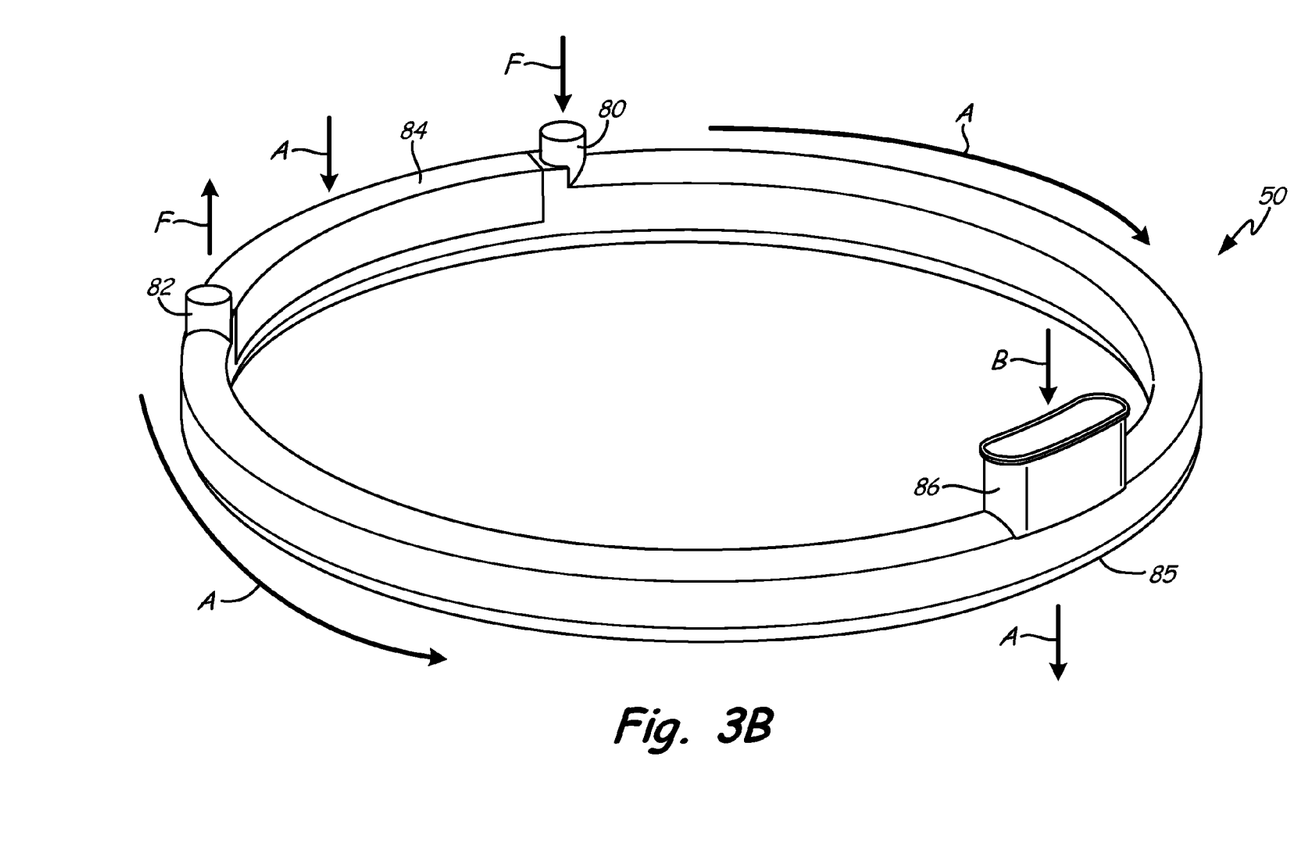

FIGS. 3A is a perspective view of first heat exchanger 50 attached to turbine 60, and FIG. 3B is a perspective view of first heat exchanger 50 with turbine 60 removed. First heat exchanger 50 includes fuel inlet 80, fuel outlet 82, air inlet 84, air outlet 85, and bypass 86. Turbine 60 includes inner case 87, outer case 88 and working air flow 90. Also shown are air flow A, fuel flow F, and bypass air flow B. First heat exchanger 50 is a laminated fuel-to-air heat exchanger for use in gas turbine engine 36 and thermal management system 32 of FIG. 2. The description first heat exchanger 50 with respect to FIG. 3A-3B applies equally to second heat exchanger 52 from FIG. 2.

First heat exchanger 50 is formed as a ring that surrounds turbine 60. Fuel flow F (such as deoxygenated fuel from fuel system 34 of FIG. 2), enters first heat exchanger 50 at fuel inlet 80 and exits first heat exchanger 50 at fuel outlet 82. Air flow A (such as bleed air from compressor 58 of FIG. 2) enters first heat exchanger 50 at air inlet 84, flows around the ring body, and exits first heat exchanger 50 at air outlet 85 located opposite of air inlet 84. Within first heat exchanger 50, air flow A and fuel flow F are in a heat exchange relationship whereby air flow A is cooled and fuel flow F is heated. Bypass air flow B passes directly through bypass 86, which extends straight through first heat exchanger 50 to outlet 85. Bypass 86 allows bypass air flow B to avoid flowing along the ring body of first heat exchanger 50 and thereby avoiding a heat exchange relationship with the fuel. Preferably, first heat exchanger 50 is of the laminated type. Laminated heat exchangers are described in U.S. patent application Ser. No. 12/985,064 filed on Jan. 5, 2011 and titled "Laminated Heat Exchanger", which is commonly assigned to Hamilton Sundstrand and hereby incorporated by reference as if it were set forth in its entirety.

First heat exchanger 50 is "in-situ" within an engine (such as gas turbine engine 36) and attached around turbine 60. Specifically, first heat exchanger 50 is located between inner case 87 and outer case 88 of turbine 60. In other words, first heat exchanger 50 is formed as a ring that extends around the circumference of inner case 87. If an additional fuel-air heat exchanger is desired (such as second fuel-air heat exchanger 52 from FIG. 2), it can be placed behind first heat exchanger 50, such that it also surround turbine 60. As known in the art, vanes and blades are located radially inward from inner case 87 to expand working air flow 90. This in-situ laminated heat exchanger 50 is superior to conventional heat exchangers (e.g. plate/fin or tube/shell) positioned outside of gas turbine engine 36 because the laminated design is smaller, lighter, and more evenly distributes air flow.

Figure 4A:
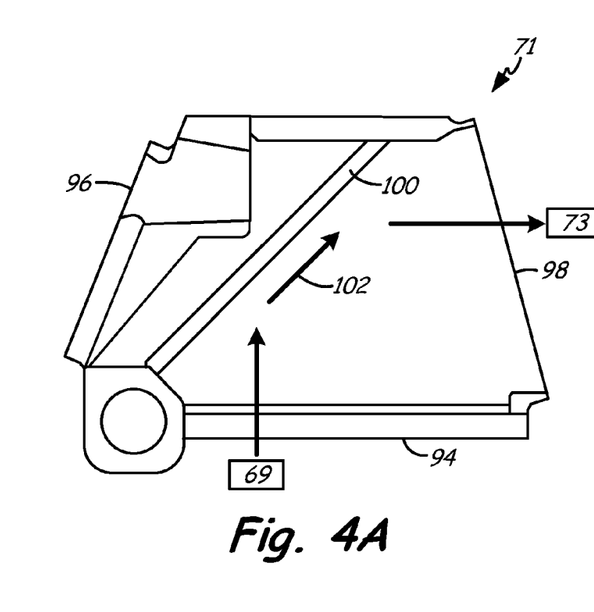
FIGS. 4A and 4B are cross sectional views of a gate valve for use in the thermal management system of FIG. 2.
Figure 4B:
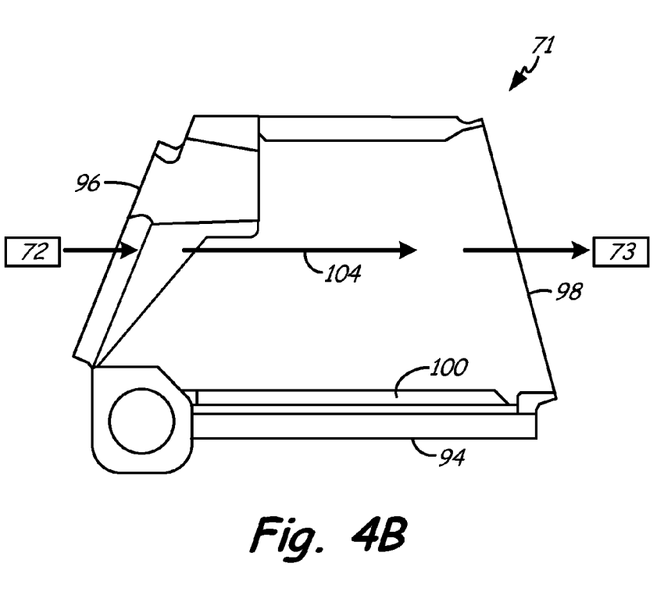

FIG. 4A is a cross sectional view of gate valve 71 in a first position, and FIG. 4B is a cross sectional view of gate valve 71 in a second position. Gate valve 71 is intended for use in thermal management system 32 of FIG. 2. Shown in FIGS. 4A and 4B are bypass conduit 69, first cooled air conduit 72, and first exhaust conduit 73. Gate valve 71 includes first inlet 94, second inlet 96, outlet 98, flapper 100, bypass bleed air 102, and cooled bleed air 104. FIG. 4A shows flapper 100 in a raised position such that bypass bleed air 102 flows through gate valve 71 and FIG. 4B shows flapper in a lowered position such that cooled bleed air 104 flows through gate valve 71.

Gate valve 71 is intended for use with first heat exchanger 50 from FIGS. 2-3B and can also be used with second fuel-air heat exchanger 52 from FIG. 2. Gate valve 71 has two air inlets (first inlet 94 and second inlet 96), and a single air outlet 98. Located in the center of gate valve 71 is flapper 100. Accordingly, gate valve 71 is known as a three-way flapper valve. Gate valves are described in U.S. pat. app. Ser. No. 12/879,659 filed on Sep. 20, 2010 and titled "Gate Valve", which is commonly assigned to Hamilton Sundstrand and hereby incorporated by reference as if it were set forth in its entirety.

First inlet 94 is connected to bypass conduit 69, second inlet 96 is connected to first cooled bleed air conduit 72, and outlet 98 is connected to first exhaust air conduit 73. FIG. 4A shows flapper 100 in a raised position where second inlet 96 is blocked and first inlet 94 is open. In FIG. 4A, bypass bleed air 102 flows from bypass conduit 69 through gate valve 71 to first exhaust air conduit 73. This "bypass" configuration of gate valve 71 can be used when an engine (such as gas turbine engine 36 from FIG. 2) is starting up, and/or powering an aircraft that is taking off, climbing, descending, or landing. In the bypass configuration, compressor 58 bleed air would bypass around first fuel-air heat exchanger 50 and flow to turbine 60 via first exhaust air conduit 73.

FIG. 4B shows flapper 100 in a lowered position where first inlet 94 is blocked and second inlet 96 is open. In FIG. 4B, cooled bleed air 104 flows from first cooled bleed air conduit 72 through gate valve 71 to first exhaust air conduit 73. This "heat exchanger" configuration can be used when an engine (such as gas turbine engine 36 from FIG. 2) is powering an aircraft that is cruising at altitude. In the heat exchanger configuration, compressor 58 bleed air would be directed through first bleed air conduit 68 to first fuel-air heat exchanger 50 for cooling. The first cooled bleed air would exit first heat exchanger 50 through first cooled air conduit 72, pass through gate valve 71, and then be directed to turbine 60 via first exhaust air conduit 73. A modulated configuration that is partially between the bypass configuration of FIG. 4A and the heat exchanger configuration of FIG. 4B is also contemplated and within the scope of this disclosure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for managing thermal transfer in an aircraft, the system comprising:
 a fuel stabilization unit for creating deoxygenized fuel;
 a first fuel-air heat exchanger fluidly connected to the fuel stabilization unit and fluidly connected to a first portion of an engine compressor via a first bleed air conduit extending between the first portion of the engine compressor and the first fuel-air heat exchanger, the first fuel-air heat exchanger configured to place the deoxygenized fuel in a heat exchange relationship with first bleed air to produce heated deoxygenized fuel and cooled first bleed air;
 a turbine fluidly connected to the first fuel-air heat exchanger and operationally connected to the engine compressor, the turbine configured to receive the cooled first bleed air;
 a fuel-to-engine conduit connected to the first fuel-air heat exchanger for transporting the heated deoxygenized fuel to a combustor; and
 a second fuel-air heat exchanger fluidly connected to the first fuel-air heat exchanger and fluidly connected to a second portion of the engine compressor upstream of an exit of the compressor and downstream of an entrance to the compressor via a second bleed air conduit extending between the second portion of the engine compressor and the second fuel-air heat exchanger, the second fuel-air heat exchanger configured to place the heated deoxygenized fuel in a heat exchange relationship with second bleed air to produce further heated deoxygenized fuel and cooled second bleed air;
 wherein each of the first and second fuel-air heat exchangers is formed as a ring attached to and surrounding the turbine and is located between an inner casing and an outer casing of the turbine, such that the first and second fuel-air heat exchangers extend around a circumference of the inner casing.

2. The system of claim 1, wherein the turbine is configured to receive the cooled second bleed air.

3. The system of claim 2, wherein a case of the turbine is configured to receive the cooled first bleed air and a stator of the turbine is configured to receive the cooled second bleed air.

4. The system of claim 1, wherein the first fuel-air heat exchanger is a laminated in-situ heat exchanger.

5. The system of claim 1, wherein the heated deoxygenized fuel has a temperature above 310° F.

6. The system of claim 1, wherein the cooled first bleed air has a temperature below 640° F.

7. A system for managing thermal transfer in an aircraft, the system comprising:
 a fuel tank;
 a first fuel-oil heat exchanger located downstream from the fuel tank;
 a fuel stabilization unit located downstream from the fuel-oil heat exchanger;
 a first fuel-air heat exchanger located downstream from the fuel stabilization unit;
 a second fuel-air heat exchanger located downstream from the fuel stabilization unit;
 an engine compressor having a first location fluidly connected to the first fuel-air heat exchanger via a first bleed air conduit extending between the first location and the first fuel-air heat exchanger, and having a second location fluidly connected to the second fuel-air heat exchanger via a second bleed air conduit extending between the second location and the second fuel-air heat exchanger, wherein the second location is upstream of an exit to the engine compressor and downstream of an entrance to the engine compressor;
 a combustor located downstream from the first fuel-air heat exchanger;
 a turbine operationally connected to both the engine compressor and the combustor; a first conduit fluidly connecting the first fuel-air heat exchanger to the turbine; and
 a three way valve comprising:
 a first inlet fluidly connected to the engine compressor;
 a second inlet fluidly connected to the first fuel-air heat exchanger; and
 an outlet fluidly connected to the turbine;
 wherein each of the first and second fuel-air heat exchangers is formed as a ring attached to and surrounding the turbine and is located between an inner casing and an outer casing of the turbine, such that the first and second fuel-air heat exchangers extend around a circumference of the inner casing.

8. The system of claim 7, further comprising:
 a second fuel-oil heat exchanger located downstream of the fuel stabilization unit.

9. The system of claim 7, further comprising:
 a fuel pump and metering unit located downstream of the fuel stabilization unit.

10. The system of claim 7,
 wherein the second fuel-air heat exchanger is located downstream from the first fuel-air heat exchanger and upstream of the combustor.

11. The system of claim 10, further comprising:
 a second conduit fluidly connecting the second fuel-air heat exchanger to the turbine.

12. A method for managing thermal transfer in an aircraft, the method comprising: storing fuel;

removing oxygen from the stored fuel to create deoxygenized fuel;

placing the deoxygenized fuel in a heat exchange relationship with a first portion of first bleed air from a compressor via a first bleed air conduit extending between a first location of the compressor and a first fuel-air heat exchanger to produce heated deoxygenized fuel and cooled first bleed air, wherein the first fuel-air heat exchanger is formed as a ring attached to and surrounding a turbine and is located between an inner casing and an outer casing of the turbine, such that the first fuel-air heat exchanger extends around a circumference of the inner casing;

directing a second portion of the first bleed air through a bypass conduit;

directing the cooled first bleed air and the second portion of the first bleed air to the engine turbine;

cooling the engine turbine with the cooled first bleed air and the second portion of the first bleed air; and placing the heated deoxygenized fuel in a heat exchange relationship with second bleed air from the compressor via a second bleed air conduit extending between a second location of the compressor and a second fuel-air heat exchanger to produce further heated deoxygenized fuel and cooled second bleed air, wherein the second location is upstream of an exit to the compressor and downstream of an entrance to the compressor, wherein the second fuel-air heat exchanger is formed as a ring attached to and surrounding the turbine and is located between the inner casing and the outer casing of the turbine, such that the second fuel-air heat exchanger extends around the circumference of the inner casing; and combusting the further heated deoxygenized fuel.

13. The method of claim 12, further comprising:
cooling the engine turbine with the cooled second bleed air.

14. The method of claim 13, wherein the second bleed air is hotter than the first portion of the first bleed air and the second portion of the first bleed air.

15. The method of claim 13, wherein the cooled first bleed air cools a case of the turbine and the cooled second bleed air cools a stator of the turbine.

* * * * *